United States Patent [19]

Wyzykowski

[11] Patent Number: 5,458,277
[45] Date of Patent: Oct. 17, 1995

[54] PERSONAL CARRIER FOR PARTIALLY CONSUMED CONFECTIONS

[76] Inventor: Sandra J. Wyzykowski, HC 89, Box 200, Stillwater Estates, Pocono Summit, Pa. 18346-9702

[21] Appl. No.: 248,405

[22] Filed: May 24, 1994

[51] Int. Cl.⁶ .............................. A45F 5/00; B65D 81/00
[52] U.S. Cl. ..................... 224/202; 224/257; 220/4.24
[58] Field of Search .................... 206/470, 471, 206/38, 38.1, 240, 234, 235, 351, 352, 244; 224/202, 203, 219, 220, 222, 257, 258, 267; 220/4.24, 4.22, 4.23, 326, DIG. 13, 4.25; 426/106, 112

[56] References Cited

U.S. PATENT DOCUMENTS

| | | | |
|---|---|---|---|
| 1,417,121 | 5/1922 | Whitehouse | 206/244 |
| 2,727,547 | 12/1955 | Moon, 3rd | 206/38 R |
| 2,858,014 | 10/1958 | Koziol | 220/4.24 |
| 3,394,838 | 7/1968 | Larkin | 220/326 |
| 3,641,697 | 2/1972 | Heidtman et al. | 220/4.22 |
| 4,077,515 | 3/1978 | Shoberg | 220/4.24 |
| 4,119,248 | 10/1978 | Butler et al. | 224/202 |
| 4,512,474 | 4/1985 | Harding | 220/4.23 |
| 4,541,528 | 9/1985 | Holmes | 220/4.23 |
| 4,905,857 | 3/1990 | Her | 220/4.22 |
| 5,042,658 | 8/1991 | Tiramani et al. | 206/349 |

FOREIGN PATENT DOCUMENTS

| | | | |
|---|---|---|---|
| 241330 | 11/1964 | Austria | 220/DIG. 13 |
| 2558695 | 8/1985 | France | 224/202 |
| 391302 | 4/1933 | United Kingdom | 206/244 |
| 2277511 | 2/1994 | United Kingdom | 224/199 |

*Primary Examiner*—Henry J. Recla
*Assistant Examiner*—Gregory M. Vidovich
*Attorney, Agent, or Firm*—Jacobson, Price, Holman & Stern

[57] ABSTRACT

A carrier for supporting a lollipop consisting of a container forming a housing having a spherical end portion sized for receiving the body of candy of the lollipop and a hollow cylindrical tubular portion extending therefrom sized to receive a stick extending from the candy body wherein the container is formed of two substantially identical half members and a flexible support member connected to the container and being adapted for support about the neck of a user.

6 Claims, 3 Drawing Sheets

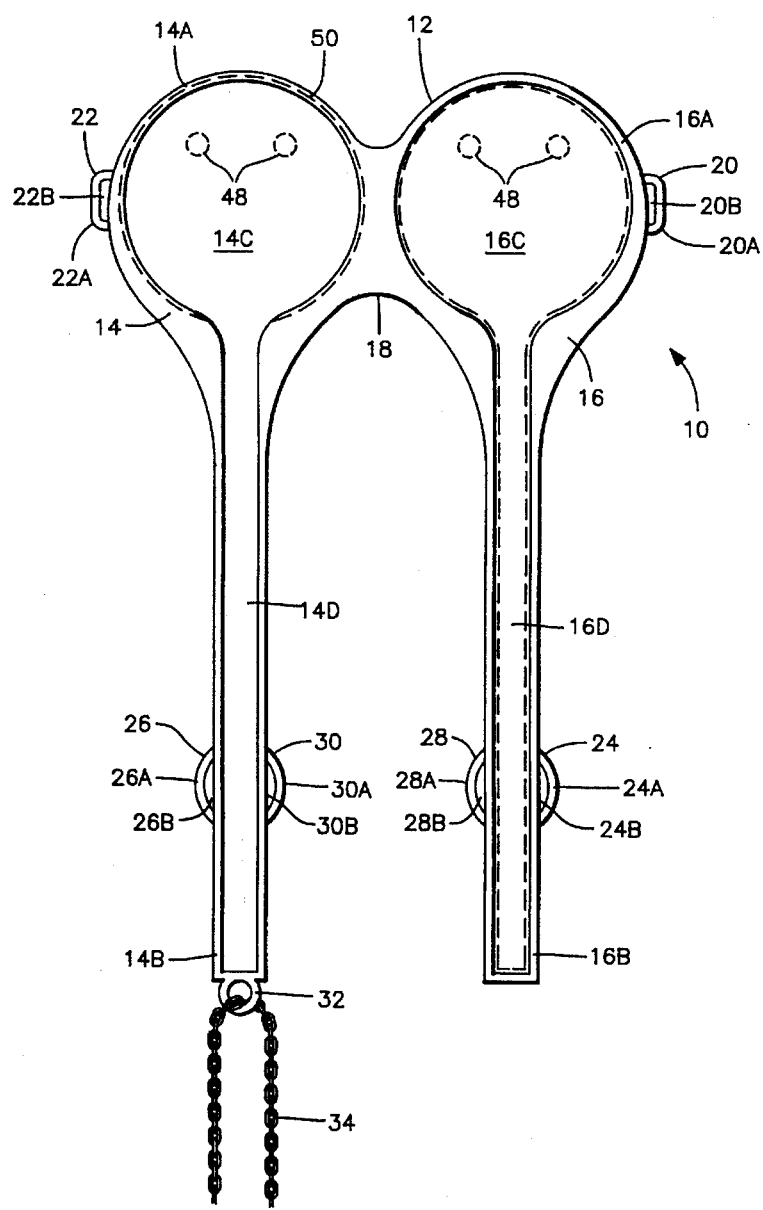
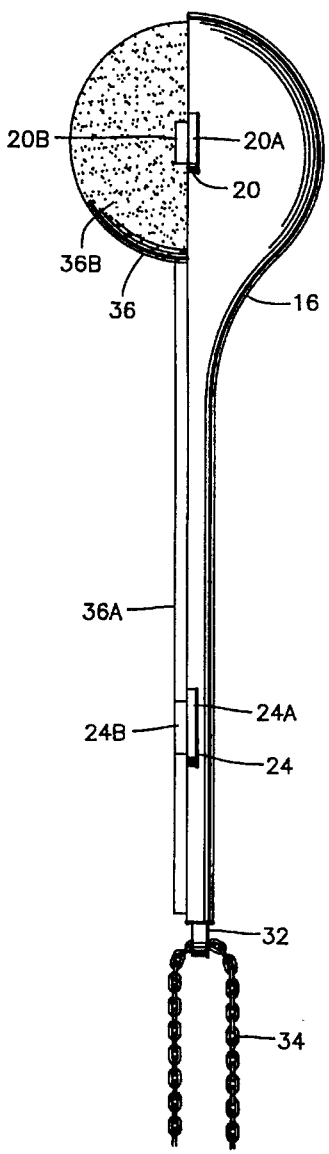

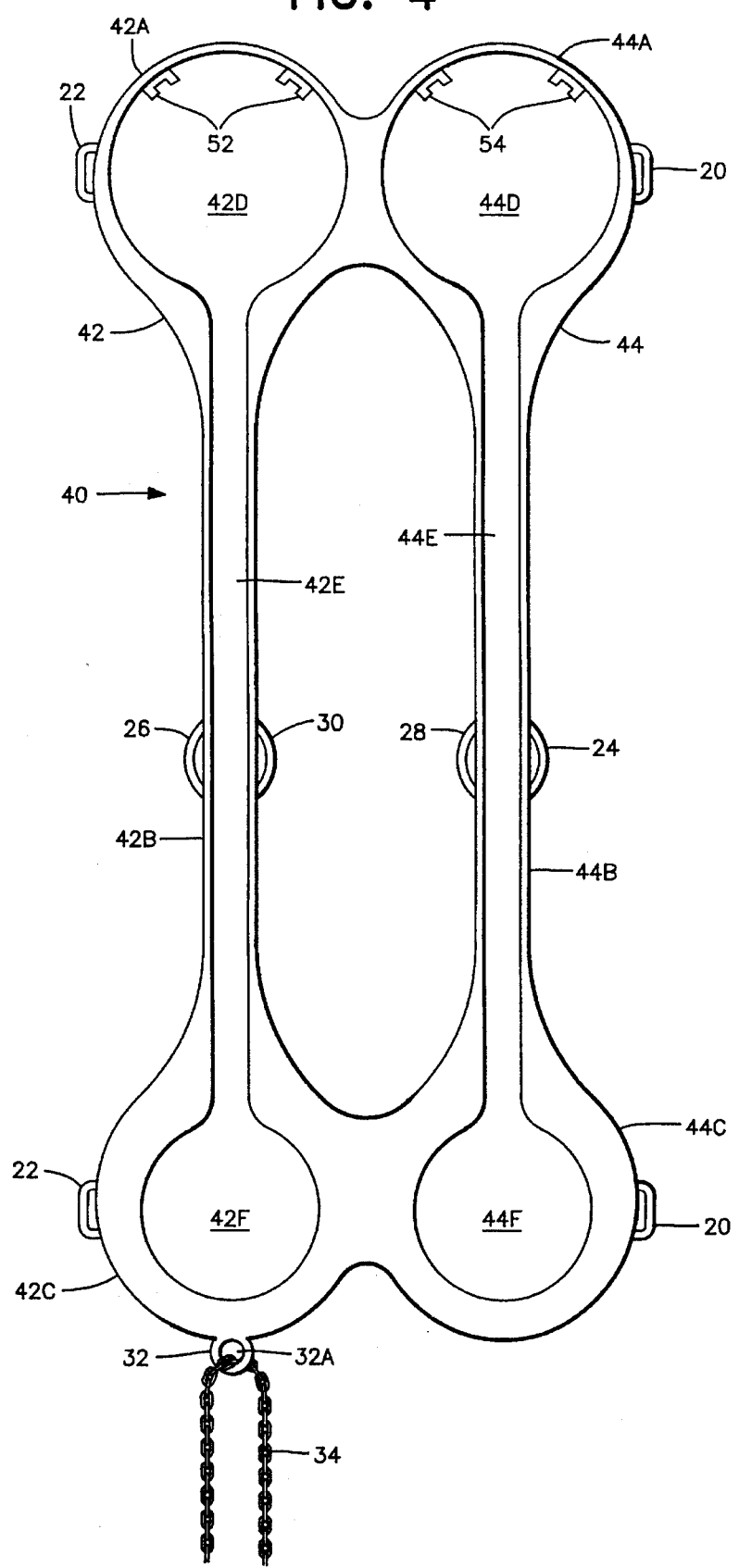

PERSONAL CARRIER FOR PARTIALLY CONSUMED CONFECTIONS

BACKGROUND OF THE INVENTION

1. Field of the Invention

This invention relates generally to the type of candy referred to as lollipops, and more particularly, to a portable container for lollipops which container is adapted for insertion therein of a lollipop after it has been partially consumed and which is effective to maintain the sanitary condition of such lollipop while being carried or transported on the person of the consumer.

2. Prior Art

A lollipop may be defined as a hard sucking candy adapted for partial or total placement in the mouth for progressive dissolution due to the action of the liquid portion of the saliva upon the easily soluble body of the candy. Lollipops are usually eaten or consumed either by licking, or alternatively, by total containment in the mouth where the liquid environment causes dissolution of the sugary principal portion of the lollipop into saliva in the mouth. Thereafter, such sugary dissolved portion may be swallowed, providing the user with a sweet taste typical of these candies.

The fact that the principal soluble portion of the lollipop is typically fairly large, and due to the fact that lollipops are frequently consumed by children who lead active lives and thereby move around frequently, means that lollipops are frequently not completely consumed at one straight sitting, or period of time, but are instead frequently sucked on for a short period of time and then laid down while the child engages in some alternative activity, picked up again and sucked for awhile, laid down again and so on, so that the total time taken to consume a lollipop may frequently approach infinity, such because the lollipop is laid down frequently, it either becomes lost or contaminated such that further consumption of such lollipop is no longer desirable, at which time the lollipop will be discarded.

The fact that the lollipop may not be completely consumed is not particularly critical. However, the fact that the lollipop is laid down frequently and during such periods of down time, may become contaminated and thereafter no longer be fit for human consumption can assume a relatively great importance. Perhaps even more important, so far as the parents of children concerned, is the fact that when a lollipop is laid down it tends to contaminate the surface upon which it is placed. For example, it is not uncommon for a child to lay a lollipop down on furniture and painted surfaces which may be damaged by the sticky substance or in other places where either the lollipop itself may be rendered unfit for further consumption or the surface upon which it is laid may be rendered less desirable than it was before, at least to the extent that such surface may require washing to remove the sticky residue derived from the lollipop, and in particularly egregious cases, the contaminated surface may even be detrimentally degenerated by the lollipop residue which may in some cases be sufficiently strong to take off the paint or other coating on the surface or to so contaminate the surface that it can no longer be used for its intended purpose. It is also not uncommon for lollipops to mysteriously show up on chairs or other seating surfaces where such lollipops may be sat or reclined upon, rendering the person who has attempted to sit upon such surface relatively agitated in their demeanor, or worse.

There has been a need, therefore, for rendering a partially-consumed lollipop relatively innocuous and maintaining it in a sanitary condition by isolating it from the environment. Consequently, there has been a need for a means in which a lollipop could be stored during temporary non-use or non-consumption, which storage means would protect such lollipop from the surrounding environment so that it can be safely continued to be consumed or sucked over a period of time and also protecting the surrounding environment from the lollipop so that such surrounding environment, for example, painted or upholstered surfaces, are not detrimentally degraded by coming in contact with such lollipop. So far as the present inventor is aware, there have been no effective lollipop holders heretofore available or, for that matter, even non-effective lollipop holders, particularly for use on the person of the user him or herself.

The inventor is aware of the following patents directed to containers, and capsules such as lockets, ampules and the like for carrying various objects upon the person, but which are not suitable for the purpose for which the Applicant's invention has been developed, e.g. to hold a lollipop. In particular, there has been no lollipop holder by which such lollipop may be secured to the person of the user so that it cannot become lost while it can be taken out and sucked at any time. There have been previous containers made especially for holding sustenance, medical items or items such as chewing gum between uses, but none has been designed particularly, so far as the present inventor is aware, for the storage of lollipops on the person, particularly during active play or the like by children.

The following are examples of prior art disclosures of receptacles used for the containment of various objects other than lollipops, per se, and particularly for the storage between uses of chewing gum.

U.S. Pat. No. 206,017 [Henderson] for "Tobacco-Quid Protector" issued Jul. 16, 1878 discloses a tobacco quid protector including two convex plates hinged together. Apparently, the tobacco was intended to be placed in the protector which had holes in it and then placed in the mouth to become warm and moist before use.

U.S. Pat. No. 603,949 [Harding] for "Receptacle for Chewing Gum" issued May 10, 1898 discloses a cylindrical receptacle for chewing gum. The chewing gum is placed in the receptacle when not being chewed and the receptacle may be attached to the clothing by a pin arrangement. The bottom of the receptacle has a point on which the chewing gum may be impaled and the chewing gum may be removed from the receptacle when it is desired to chew it by opening one side. The pin also keeps the chewing gum centered in the center of the receptacle.

U.S. Pat. No. 969,329 [Blake] for "Gum Box" issued Sep. 6, 1910 discloses a gum box for holding chewing gum. The lower portion of the box apparently holds sticks of unchewed chewing gum and a section at the top of the box holds chewed chewing gum. The box is elongated rectangular in shape, but does not have a small section and a large diameter section.

U.S. Pat. No. 1,040,420 [Roop] for "Receptacle for Chewing Gum" issued Oct. 8, 1912 discloses another receptacle for chewing gum which also has a pin attached to it.

U.S. Pat. No. 2,484,892 [Keston] for "Chewed Gum Receptacle" issued Oct. 18, 1949 discloses a chewing gum holder formed basically from a flat blank which may be assembled into a box for the chewing gum when it is desired to save some used chewing gum.

U.S. Pat. No. 3,283,717 [Balch] for "Emergency Survival Capsule" issued Nov. 8, 1966 discloses an emergency survival capsule which may be worn around the neck. The capsule is elongated in shape and may have various objects placed in it such as a flare, matches and the like. The elongated locket or survival capsule does not have two diameter sections and would be easily adaptable to hold a lollipop.

U.S. Pat. No. 4,078,662 [Volland] for "Used Chewing Gum Storage Receptacle" issued Mar. 14, 1978 discloses a chewing gum receptacle including a base member with several recesses in which chewing gum can be "parked" and a transparent cover which goes over the entire device. The cover may have small figurines on top. The recesses are designed to receive disposable cups with the intent of preventing the chewing gum from sticking to the chewing gum holder. The disposable cups may comprise a portion of an entire liner for the receptacle. It is intended that when the cups become completely full of chewing gum, the whole liner will be disposed of and for this purpose the liner is made of a cheap, readily-replaceable material.

U.S. Pat. No. 4,333,562 [Todd] for "Capsule for Storing Written Information" issued Jun. 8, 1982 discloses a capsule in which written material, and particularly medical records and the like, may be inserted. The capsule is made in two parts which are screw-thread to each other and may be hung around the neck of the user by means of a lanyard through a ring at the top of the device.

U.S. Pat. No. 4,691,822 [Malancon, Jr.] for "Container and Holder for Dispensing Baking Soda" issued Sep. 8, 1987 discloses a baking soda dispenser in which there is a cap at the top on a biased side and a decreased radius section at the bottom by which the holder may be grasped with the hand. Such decreased-sized bottom also facilitates storage of the baking soda dispenser in an open-bottom bracket.

U.S. Pat. No. 4,733,807 [Porter, et al.] for "Container for Medicinals" issued Mar. 29, 1988 discloses a container for medicines which may be worn around the neck.

U.S. Pat. No. 4,866,952 [Hight, et al.] for "Pendant Container for Tablets and Capsules" issued Sep. 19, 1989 discloses a pendant-type container for medicinal tables and capsules. The pendant container is formed of an upper and a lower half which fit together with a snap action which it is said may be readily operated by an incapacitated person. Essentially, a resilient top half is snapped over a ridge on the bottom half. It is claimed that the seal is gas-tight and it may involve the use of an O-ring on one of the halves of the pendant.

U.S. Pat. No. 5,042,658 [Tiramani, et al.] for "Holder for a Personal Razor" issued Aug. 27, 1991 discloses a holder for a personal razor. Such holder has a transverse section at the top which has an opening into a longitudinal section at the bottom which accommodates a handle of a razor while the transverse section at the top accommodates the head of the razor. The top of the storage case opens in a hinged manner and may be snapped shut by means of a snap-type latch.

U.S. Pat. No. 5,158,174 [Hereford] for "Jewelry Container for Cremation Ashes" issued Oct. 27, 1992 discloses a jewelry container adapted to contain cremation ashes. The container is made in the form of a pendant which is held around the neck, presumably of a relative of the deceased. The pendant is longitudinally elongated and has a support ring.

In addition to the above-noted patents, Applicant is also aware of the following patent, an abbreviated disclosure of which is in the possession of Applicant.

U.S. Pat. No. 395,515 [unidentified patentee] for "Chewing-Gum Preserver" issued Jan. 1, 1889 discloses a basically modified ovoid chewing gum locket for storage of already partially masticated chewing gum in a pendant until the owner wishes to recommence chewing of such gum.

While, therefore, there have been containers for carrying on the person various drugs and comestible as well as carrying other types of materials such as chewing gum in various environments, no practical container for carrying lollipops is believed heretofore to have been known.

OBJECTS OF THE INVENTION

It is an object of the present invention, therefore, to provide a container for temporarily holding lollipops which container may be easily carried upon the person of the user and which will prevent both contamination of the lollipop by substances from the environment and contamination of the environment by the sticky surface of the lollipop.

It is a further object of the present invention to provide a lollipop holder having a shape which is particularly adapted to containment of a lollipop together with a suspension mechanism which places the lollipop in an orientation in which the handle is not contaminated by sticky liquid or saliva running down such handle while the lollipop is being stored for future use.

It is a still further object of the present invention to provide a lollipop holder having a relatively long narrow smaller section and a relatively fat or wide upper section which will encompass a lollipop and hold it for quick use with a minimum detriment to either the lollipop surface with respect to the environment in which the lollipop is used, which environment might well otherwise become contaminated with the substance of the lollipop.

It is a still further object of the present invention to provide a locket-type lollipop holder which may be suspended from the body, and particularly from the neck of the wearer, by a cord in a position such that the lollipop is kept safe and there is little opportunity for injury to the wearer in a fall or the like.

It is a still further object of the present invention to provide a lollipop holder having all rounded surfaces which will not injure the wearer.

It is a still further object of the present invention to provide a lollipop holder designed especially to maintain such lollipop in a safe position.

It is a still further object of the present invention to provide a lollipop holder having at least two internal storage compartments which allow such holder to store unused lollipops as well as partially-used lollipops in a safe and sanitary environment.

It is a still further object of the present invention to provide a lollipop holder having an injury-proof surface.

It is a still further object of the present invention to provide a lollipop holder which may be opened along a hinged section to gain access to the entire internal body of the holder.

It is a still further object of the present invention to provide a lollipop holder constructed from a polymeric substance having sufficient strength to stand hard usage.

Other objects and advantages of the present invention will become evident from the following description and explanation.

BRIEF DESCRIPTION OF THE INVENTION

A lollipop holder for use particularly by children is provided in which the shape of the lollipop holder is designed to conform generally to the shape of the lollipop and which is designed to be supported from a lanyard about the neck of the user or from a pin or the like from the clothing of the user, leaving the hands of the user free for other activities. The lollipop holder is configured on the exterior and/or the interior in the shape of a first expanded section adapted to contain the candy portion of the lollipop plus a second elongated portion adapted to contain the stick of the lollipop. The lollipop holder is designed to be held or suspended when containing a partially used lollipop in a position in which the larger expanded portion is oriented downwardly and the narrower or elongated portion is oriented upwardly so that any moisture remaining on the lollipop after partial consumption will not drain onto the stick or handle of such lollipop making it sticky and unpleasant for handling by the fingers of the lollipop eater. Means for preventing leaking out of liquid from the expanded section are also desirable. An air interchange means or orifice may be provided to allow evaporation of moisture from within the container while still providing a sanitary environment for storage of the lollipop. The lollipop holder is provided with all rounded corners so that it will not injure the user in case of a fall or the like and the outside may be designed to be other than the actual shape of the lollipop holder in order to further limit the possibility of injury from falling upon such holder as well as to provide more surfaces for possible advertising material upon the lollipop holder. Latch-type means are molded into the holder along the sides and alternative versions of the lollipop holder may be provided with at least two compartments, one of which will contain one or more unused lollipops while the other may contain a used lollipop. The exterior of the lollipop holder may also be other than the shape of the interior and an oblong holder may at times be advantageous.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 1 is a plan view of a basic embodiment of the lollipop holder of the present invention in an open position.

FIG. 2 is a side elevational view of the embodiment of the present invention shown in FIG. 1 with the hinged top opened to show a lollipop within the holder.

FIG. 4 is a side view of an alternative embodiment of the lollipop holder of the present invention in an open position.

DESCRIPTION OF THE PREFERRED EMBODIMENTS

Figure 3:
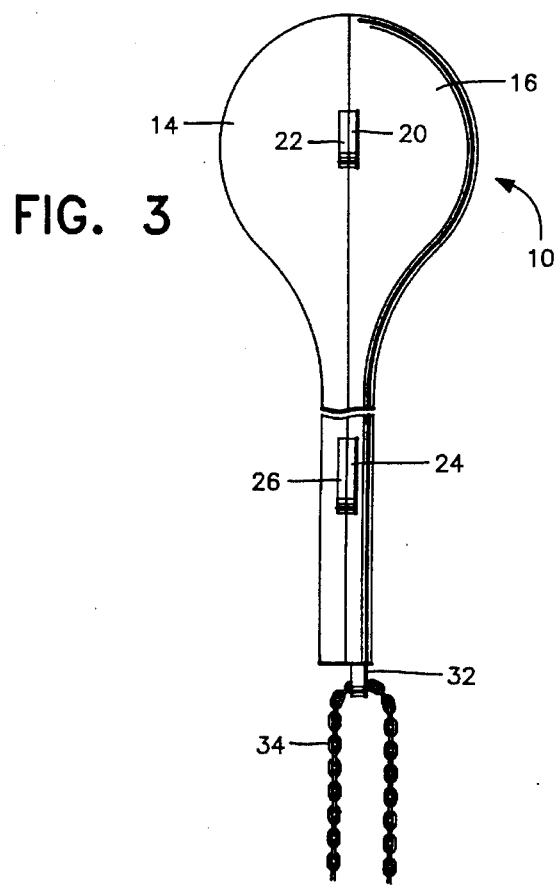
FIG. 3 is a side elevational view of the lollipop holder of the present invention shown in a closed condition.

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 a transportable retaining means 10 for used lollipops and other edible products preferably having a shaped lump of candy situated at one end of a stick. The transportable retaining means 10 provides a convenient and sanitary lollipop holder which may be used by children, in particular, to hold their lollipops, while they are engaged in play, between actual consumption of such lollipop. As is well known, children, as well as other young people, as well as some adults, frequently enjoy sweet edibles or comestibles such as pikes, cakes and candy. One of the most popular types of candy for children is the ubiquitous lollipop which takes the form of a hard lump of candy attached to a stick which provides a convenient holding means by which the child or other person may hold their candy in their hand without getting their hands sticky and as a result, may lick or suck the lollipop without placing it entirely within the mouth or may place it entirely in the mouth, but have a way of removing it when the concentration of sweetened comestible becomes too concentrated within the saliva. In this way, not only may hard candies be consumed over a period of time, but larger candies can be easily consumed that might normally be impractical to place in the mouth. For example, a child may merely lick the candy, and indeed, such licking seems to be particularly enjoyable for children, possibly as a result of some atavistic urges or memories.

The use of hard but soluble candies make it quite convenient and enjoyable for consumers to continue to eat a lollipop over a long period of time until it is completely consumed. This is particularly the case with children, whose attention is easily diverted to other matters, particularly after they have consumed a minimum amount of the soluble comestible. In such cases, since the child or other person has nowhere to store their lollipop, they will frequently either place it in their pocket with disastrous effects due to the stickiness of the candy, or lay it down in some place which may be equally disastrous with respect to the ultimate cleanliness of the lollipop itself and frequent contamination of the surface where the lollipop is placed by the sticky liquid which may frequently still be upon its surface when the lollipop is laid down.

Various means for avoiding these disadvantages of lollipops have been suggested. For example, a paper or other cover may be placed over the lollipop which will partially protect it both from the environment and the environment from the lollipop when it is laid down. However, the provision of a paper protective cover partially covering the lollipop is disadvantageous because it is itself easily contaminated and also tends to become stuck to the lollipop itself. The present invention obviates these major disadvantages of lollipops by providing a lollipop retaining means or holder 10. This lollipop holder 10 prevents the lollipop from becoming contaminated by the surrounding environment and also, conversely, contains and confines the candy portion of a lollipop so as not to contaminate the surrounding environment.

The lollipop holder or retaining means 10, shown in FIG. 1, preferably comprises a polymeric and light transmissive material so that it may be of sufficient strength to withstand hard use while also allowing the internal body or the holder 10 and, thus, the product that it is retaining to be viewed by the human eye. The lollipop retaining means 10 comprises a container 12 having first and second portions 14 and 16, respectively, that are brought together by flexible section 18. The first portion 14 has a first end 14a and a second end 14b. Similarly, the second portion 16 has a first end 16A and a second end 16b.

The lollipop holder 10 further comprises means for releasably securing the first and second portions 14 and 16 of the container 12 together and which means comprises latching member 20, 22, 24, 26, 28 and 30. The lollipop holder 10 further comprises means 32 for preferably attaching one of the first and second ends 14b and 16b of the first and second portions 14 and 16, respectively, to a flexible support means 34.

The first and second portions 14 and 16 have a combined space and an internal body for enveloping an entire edible product placed on a stick with a known length and having a shaped lump of candy situated on one end of the stick. More particularly, the first and second portions 14 and 16 each have a first end (14a and 16a) having a first cross-sectional configuration (14c and 14d), whereby the combined space defined by the configurations 14c and 16c is sufficient to encompass the shaped lump candy and, similarly, have a second end (14b and 16b) having a second cross-sectional configuration (16c and 16d), whereby the combined space by the configurations 14d and 16d is sufficient to encompass the full length of the stick of the edible product, such as a lollipop, while not encompassing the lump of candy at the one end of the lollipop. The non-encompassing or non-contacting of the lump of candy allows the first and second portions 14 and 16 to be brought together and closed in a manner to be described.

The first cross-sectional configurations 14c and 16c are similarly dimensioned and each have a shape that is selected to accommodate the shaped lump candy product such as that having a hemispherical shape, shown in FIG. 1, a round shape or any other shape that a candied product situated at the end of the stick may likely possess. The second configurations 14d and 16d are similarly dimensioned and have a relatively small transverse diameter extending away from the first configuration 14c and 16c, respectively, and have a length sufficient to contain the stick of a lollipop or some other edible product.

The flexible section 18 acts as a hinge member that allows access to the interior of the container 12. More particularly, hinge section 18 allows the container 12 to act in a similar manner as a violin case, whereby the container may be folded upward or outward to provide access to its interior space defined by the cross-sectional configurations 14c, 14d, 16c and 16d. The hinge section 18 also allows portions 14 and 16 of container 12 to be brought together and preferably snapped in place by means of the latching member 20, 22, 24, 26, 28 and 30.

All of the latching members 20–30 may be conveniently formed of a plastic composition and should be fairly stiff or rigid to be most convenient in their use. Each of the latching members 20, 24 and 28 comprises a solid member, such as 20a, from which protrudes a prong member, such as 20b. More particularly, as most clearly shown in FIG. 2, with reference to latching members 20 and 24, the solid member, such as 20a, is commonly formed on the container 12 and from which extends the prong member 20b. With reference back to FIG. 1, the latching members 22, 26 and 30 comprise a loop member, such as 22a, that defines an opening or aperture 22b. The latching members 22, 26 and 30 comprise female tabs, whereas the latching members 20, 24, 28 comprise the male tabs. More particularly, each of the latching members 22, 26 and 30, for example, latching member 22 provides a socket (the aperture 22b) into which is inserted the prong member 20b of latching member 20.

Female tab 22 cooperates with the male tab 20 to form a first pair thereof. Similarly, female tab 26 cooperates with male tab 24 to form a second pair thereof. Further, female tab 30 cooperates with male tab 28 to form a third pair thereof. All of the female tabs on the first, second and third pairs are dimensioned so that respective male tabs may be insertable into and retained by the female tab. More particularly, all of the female and male tabs are preferably dimensioned so that the male and female tabs fit together in a snap-like manner.

As seen in FIG. 1, the female (22) and the male (20) tabs are respectively located at the edges of their respective first end 14a and 16a, so that the prong 20b of the male tab 20 finds its way into aperture 22b of female tab 22 when the hinge section 18 is flexed inward allowing the second portion 16 to be brought into contact with the first portion 14. As further seen in FIG. 1, female tab 26 and male tab 24 are respectively positioned on the second ends 14b and 16b and are located in a similar manner as that of tabs 22 and 20 so that male tab 24 is insertable into and retained by the female tab 26. Further, as seen in FIG. 1, female tab 30 and male tab 28 are positioned on opposite edges of the second ends 14b and 16b, respectively, and are arranged in a similar manner as that of tabs 22 and 20 and tabs 26 and 24.

In operation, all that is required to releasably secure the first and second portions 14 and 16 together is that one need only separately grasp portions 14 and 16 and then fold them together causing the hinge section 18 to flex and continue such folding until the male tab 20 finds it way into female tabs 22, male tab 24 finds it way into female tab 26, and male tab 28 finds it way into female tab 30. Although three pairs (20–22, 24–26 and 28–30) have been described for closing the lollipop retaining means 10, two pairs, such as 20–22 and 24–26, are sufficient to provide the closing function. The closed position of the lollipop retaining means 10 is shown in FIG. 3.

As seen in FIG. 3, the first portion 14 is intimately mated with the second portion 16, and the members 20a and 22a are mated together along with members 24a and 26a. As further seen in FIG. 3, the lollipop retainer means 10, inclusive of the female and male tabs, have rounded, and preferably, smooth surfaces. The rounded surfaces lessen the possibility of the lollipop retainer means 10 causing any damage if its user of a confined lollipop encounters a fall. Further, the smooth and relatively large surfaces allow for indicia to be placed therein so as, e.g. to identify the lollipop therein or the owner of the lollipop retaining means 10. The features of lollipop retainer means 10 with regard to a lollipop contained therein may be further described with reference back to FIG. 2.

FIG. 2 illustrates a lollipop 36 including a lump of candy 36b situated at one end of a stick 36a. As used herein, the candy 36b has two sides or faces with one face and its adjacent and associated regions covered by one portion, such as 14 or 16, of container 12, and the other face and its adjacent and associated regions covered by the other portion, such as 16 or 14. As seen in FIG. 2, particularly with reference to the lump of candy 36b, the section portion 16 has dimensions so that it provides a cover for approximately half of the lollipop 36. The first portion 14 (not shown in FIG. 2) has dimensions, complementary to those of the second portion 16, so as to provide the other half of the cover so that the container 12 provides for completely enveloping the complete edible product, such as the lollipop 36. If desired, the second portion 16 may have dimensions so as to cover the complete lollipop 36 and, similarly, the first portion 14 may also have dimensions so as to cover a second lollipop (not shown). For such a selection, the container 12 may be used to lodge two lollipops, one that has already been partially used, and the other placed in the container 12 for storage purposes.

A further embodiment of a lollipop retainer means 40 of the present invention is shown in FIG. 4 and has many of the features of the lollipop holder 10 of FIG. 1. The lollipop retainer means 40 comprises first and second portions 42 and 44, respectively. The first portion 42 has a first end 44a (similar to 14a), a middle portion 42b (similar to second end 14b) and a second end 42c. Similarly, the second portion 44 as a first end 44a (similar to 16a), a middle portion 44b (similar to second end 16b) and a second end 44c. The first end 42a has a first cross-sectional configuration 42d (similar to 14c) sufficient to cover one side or face of a first shaped lump of candy. The middle portion 42b has a second cross-sectional configuration 42e (similar to 14d) sufficient to cover the full length of a stick carrying the first lump of candy, as well as the full length of a stick carrying a second shaped lump of candy partially covered by the second end 42c. The second end 42c has a third configuration 42f sufficient to cover one face of the first shaped lump of candy. Similarly, the first end 44a has a first cross-sectional configuration 44d (similar to 16c) sufficient to cover the other face of the first shaped lump of candy. The middle portion 44b has a second cross-sectional configuration 44e (similar to 16d) sufficient to cover the full length of a stick carrying the first lump of candy, as well as the full length of a stick carrying the second shaped lump of candy partially covered by the second end 44c. The second end 44c has a third cross-sectional configuration 44f sufficient to cover the other face of the second shaped lump of candy.

The first and second portions 42 and 44 of the lollipop holder 40 are dimensioned and operate in a similar manner as the first 14 and second 16 portions of the lollipop retaining means 10 of FIG. 1. The lollipop retaining means 40 differs from that of lollipop retaining means 10 in that it has a bulbous section at both ends with one of the sections being preferably larger than the other. The lollipop retaining means 40 has certain advantages over that of lollipop retaining means 10, including its ability to adapt to larger or smaller lollipops dependent upon which section was used and without allowing for major rattling around of a smaller lollipop within an oversized (due to reduced diameter of the lollipop being used) hemispherical section, such as that may be encountered for lollipop retainer means 10 having only one relatively large hemispherical section. The cross-sectional configurations 42f and 44f may define a space that provides a compartment for lodging a partially consumed lollipop comestible, while the two cross-sectional configurations 42d and 44d may define a space that provides for compartments for wholly unconsumed comestibles that are held in reserve until the partially consumed comestible is completely consumed. Further, although a rounded configuration is illustrated for cross-sectional configurations 42d, 42f, 44d and 44f (as well as 14c and 16c of FIG. 1), other shaped configurations, such as rectangular, are contemplated by the practice of the present invention. As seen in FIG. 4, as well as FIG. 1, each of the lollipop retaining means 10 and 40 of the present invention have means 32 for attaching to a flexible support means 34, which may be further described with reference to FIG. 5.

Figure 5:
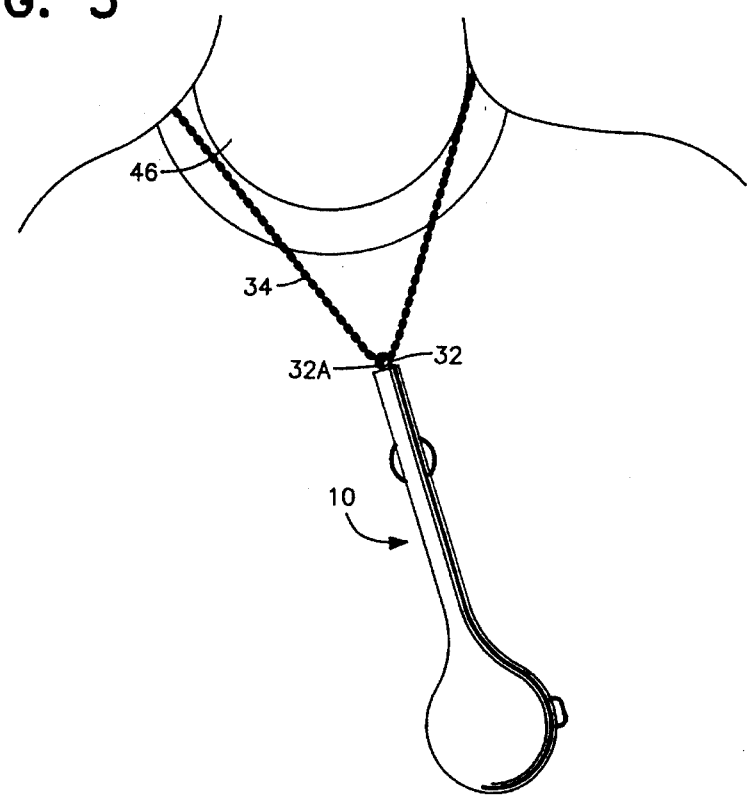
FIG. 5 is a diagrammatic view of the lollipop holder of the present invention supported in a carrying position about the neck of the user.

As seen in FIG. 5, the flexible support means 32 of the retaining means 10 has a tong eye 32a that allows for the receipt of the flexible support means 34, which may have the form of a cord or lanyard or may be a pin that allows the retaining means 10 to be attached to the garment of the user. The lanyard 34 has a sufficient length or diameter to normally go around the neck 46 of a person who wishes to carry the lollipop retaining means 10. In the embodiment shown in FIG. 1, the attachment means 32 is connected to the second end 14b (see FIG. 1) so that the head of the lollipop 36b (see FIG. 2) is worn downwardly. Such an orientation is preferable because any moisture remaining on the lollipop, after it is placed in the retaining means 10, will not drain onto the stick or handle of such a lollipop making it sticky and unpleasant for handling by the fingers of a later lollipop eater.

Since the head 36b of the lollipop 36 is worn downward, almost all of the moisture may flow into the first ends 14a and 16a of first and second portions 14 and 16, respectively. In such an arrangement, it is advantageous to provide means so that the moisture may be reduced or even not allowed to flow out of the portions 14 and 16 and onto the garments of the person carrying the lollipop holder, and such means may be further described with reference back to FIG. 1.

As seen in FIG. 1, in particular, the space defined by the first cross-sectional configurations 14c and 16c, may be provided with openings 48 (shown in phantom) which function as air vents that allow the moisture, present on the lollipop, to evaporate and eventually dry out.

As further seen in FIG. 1, in particular the first end 14a of the first portion 14, a seal 50 (shown in phantom) is advantageously supplied between the two portions 14 and 16 so that the moisture draining from the lollipop head 36b, will not escape between these two portions 14 and 16 of the lollipop retaining means 10 and otherwise contaminate the clothes of the wearer. Such a seal may be provided by a flexible gasket positioned between the two portions 14 and 16 as shown. An alternative embodiment to prevent such leaking may be described with reference to FIG. 4.

As seen in FIG. 4, first end 42a of the first portion 42 has a channel 52 that covers part of the upper region of the first cross-sectional configuration 42d, whereas the first end 44a of the second portion 44 has a channel 54 that covers part of the upper region of the first cross-sectional configuration 44d. The channels 52 and 54 have complementary dimensions so that when the first and second portions 42 and 44 are brought together, in a manner similar to that described with reference to FIG. 1 for first and second portions 14 and 16, the channel 52 lines up with the channel 54 so as to, in effect, provide a dam that blocks the moisture and liquid that may otherwise flow out of the space defined by the cross-sectional configurations 42d and 44d. Unfortunately, however, while such expediences of the channels 52 and 54 of FIG. 4, as well as the vents 48 and seal 50 of FIG. 1, can prevent leakage while the holder is closed or sealed, as soon as the holder is opened, unless it is reversed in its position illustrated in FIG. 1 before such opening, any remaining liquid is likely to drain out and possibly onto the clothing of the user. Such an unfortunate situation may be eliminated or at least reduced by an insert 56 that may be described with reference back to FIG. 1.

As seen in phantom in FIG. 1, in particular with reference to the second portion 16, a removable and discardable member 56 is insertable into the second portion 16, although this discardable member 56 is also dimensioned so as to be insertable into the first portion 14. The removable and discardable member 56 is selected to be of a material that will absorb any moisture that may be present within the confines defined by the cross-sectional configurations 14c, 14d, 16c and 16d. The removable and discardable member 56 may also be dimensioned as as to be insertable into the second lollipop retaining means 40.

It should now be appreciated that the practice of the present invention provides for retaining means 10 and 40 that allow for temporarily holding lollipops or other edible objects situated at the end of a stick and which retaining means may be easily carried upon the person of the user and which also prevents both contamination of the lollipops by substances from the environment and contamination of the environment by the sticky surfaces of the lollipops.

It should be further appreciated that the practice of the present invention provides for a suspension mechanism that places the lollipop in an orientation in which the handle is not contaminated by the sticky liquid or saliva running down such handle while the lollipop is being stored for future use.

It should be still further appreciated that the present invention provides for snap-lock lollipop holders which may be suspended from the body, and particularly from the neck of the wearer, by a cord in a position so that the lollipop is kept safe and that there is a little opportunity for injury to the wearer in a fall or the like.

It should be further appreciated that the lollipop holders of the present invention provide for the housing of one or more lollipops some of which may already been partially used and some of which may be unused and stored for future consumption.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A carrier for supporting a lollipop on a person, the lollipop including a generally spherical body of soluble candy which is dissolved by saliva when placed in the mouth thereby forming a sticky liquid and an elongated stick having one end embedded in the body of candy thereby forming a handle for manipulating the lollipop, said carrier comprising a container for supporting and protecting the lollipop, said container comprising a housing having a hollow spherical end portion sized for fully enclosing the spherical candy body and a longitudinally extending hollow cylindrical tubular portion sized for receiving the lollipop stick, said longitudinally extending portion having a transverse cross-sectional area substantially less than a transverse cross sectional area of said spherical end portion, said spherical end portion and longitudinally extending tubular portion being constructed as a pair of half members having a line of separation to form substantially identical half members with each half member being of one piece construction and including a substantially hemispherical end portion forming substantially half of said spherical end portion and a substantially semicylindrical longitudinally extending portion forming substantially half of said cylindrical tubular portion, said line of separation between the half members being defined by straight opposed peripheral edges, hinge means supporting said half members for relative pivotal movement to enable the half members to pivot from a closed position with the straight opposed peripheral edges in contact for supporting and protecting the lollipop to an open position to provide access to the lollipop, a flexible support member for extending partially around the neck of said person, said flexible support member being connected to said container for supporting the container in front of said person to support the container in an accessible position and a releasable latch structure releasably retaining said half members in said closed position to protect the lollipop and enabling access thereto.

2. The carrier as defined in claim 1 wherein said half members are constructed of polymeric material with rounded external surfaces, the longitudinally extending portion of each half member including a transverse end wall remote from the spherical end portion, the end wall on one of said half members having an axially extending eye thereon defining a supporting ring, said flexible support member extending through the eye and around the neck of said person using the carrier and supporting the carrier with the spherical end portion hanging downwardly below the supporting ring whereby any sticky liquid on the candy body will migrate downwardly in relation to the stick to prevent any sticky liquid on the candy body from coming into contact with said stick to keep a hand grasping the stick from contacting any sticky liquid, and peripheral seal means on said opposing peripheral edges of the hemispherical end portions of the half members to retain sticky liquid within the spherical end portion of said housing when said lollipop is placed in one of the half members when in said open position and the half members pivoted to said closed position and retained in said closed position by said latch structure.

3. The carrier as defined in claim 1 wherein said hinge means includes a flexible web of polymeric material integral with a portion of the opposed peripheral edges at one side of each of said half members to enable the half members to pivot about an axis extending longitudinally at said one side of said half members, said latch structure including a plurality of interengaging snap fitting members along the opposed peripheral edges along the side of the half members opposite to said flexible web to retain the half members releasably in said closed position.

4. The carrier as defined in claim 3 wherein said half members are constructed of polymeric material with rounded external surfaces, the longitudinally extending portion of each half member including a transverse end wall remote from the spherical end portion, the end wall on one of said half members having an axially extending eye thereon defining a supporting ring, said flexible support member extending through the eye and around the neck of said person using the carrier and supporting the carrier with the spherical end portion hanging downwardly below the supporting ring whereby any sticky liquid on the candy body will migrate downwardly in relation to the stick to prevent any sticky liquid on the candy body from coming into contact with said stick to keep a hand grasping the stick from contacting any sticky liquid, and peripheral seal means on said opposing peripheral edges of the hemispherical end portions of the half members to retain sticky liquid within the spherical end portion of said housing when said lollipop is placed in one of the half members when in said open position and the half members pivoted to said closed position and retained in said closed position by said latch structure, said half members closely and completely enclosing the lollipop when in said closed position.

5. The combination of a lollipop and a carrier for the lollipop for supporting engagement with a person when storing said lollipop in the carrier, said lollipop including a generally spherical body of soluble candy which is dissolved by saliva when placed in the mouth of the person consuming the candy body thereby forming a sticky liquid and an elongated stick having one end embedded in the body of candy thereby forming a handle for manipulating the lollipop, said carrier comprising a container receiving and supporting said lollipop, said container comprising a housing having a hollow spherical end portion sized for fully enclosing the spherical candy body and a longitudinally extending hollow generally cylindrical tubular portion sized for receiving the lollipop stick, said longitudinally extending tubular portion having a transverse cross-sectional area less than a transverse cross-sectional area of said spherical end portion, said spherical end portion and said longitudinally extending tubular portion of said housing being constructed as a pair of half members having a diametric line of separation to form substantially identical half members, each of said half members being of one piece construction and including a substantially hemispherical end portion forming substantially half of said spherical end portion and a substantially semi-cylindrical longitudinally extending portion forming substantially half of said cylindrical tubular portion, said diametric line of separation between the half members being defined by straight, longitudinally extending opposed peripheral edges, means supporting said half members for relative pivotal movement to enable the half members to pivot between a closed position with the straight opposed peripheral edges in contact to support and protect the lollipop and an open position to provide access to the interior of the housing to enable said lollipop to be placed in and removed from the carrier, a flexible support member for extending partially around the neck of said person, said flexible support member being connected to said carrier for supporting the carrier in front of said person to support the carrier and lollipop in an accessible position and a releasable latch structure releasably retaining said half members in said closed position to protect the lollipop when stored within said carrier and enabling access the said lollipop when desired.

6. The combination as defined in claim 5 wherein said half members are constructed of polymeric material, hinge said means supporting said half members for relative pivotal movement comprising means interconnecting said half members for relative pivotal movement, said hinge means including a flexible web of polymeric material integral with a portion of the opposed peripheral edges at one side of each of said half members to enable the half members to pivot about an axis extending longitudinally at said one side of said half members, said latch structure including polymeric tabs on the opposed peripheral edges of said half members along the side thereof opposite to said flexible web, said flexible support member connected to one of said half members at an end thereof remote from the hemispherical end portion to support the carrier and lollipop with the candy body of the lollipop positioned downwardly in relation to the elongated stick thereby preventing any residual sticky liquid that may be on the lollipop from migrating onto the stick to prevent a hand which subsequently grasps the stick from coming into contact with sticky liquid.

\* \* \* \* \*